US007444730B1

(12) United States Patent
Beatty et al.

(10) Patent No.: US 7,444,730 B1
(45) Date of Patent: Nov. 4, 2008

(54) REINFORCING BAR LIFTER AND METHOD OF REINFORCING

(76) Inventors: Laurence Lee Beatty, 9422 SW. 52 St., Cooper City, FL (US) 33328; German Fajardo, 707 SW. 8 Ave. Hallandale, Hallandale, FL (US) 33009

( * ) Notice: Subject to any disclaimer, the term of this patent is extended or adjusted under 35 U.S.C. 154(b) by 574 days.

(21) Appl. No.: 11/170,362

(22) Filed: Jun. 29, 2005

(51) Int. Cl.
*B23Q 3/00* (2006.01)
*A47B 43/00* (2006.01)

(52) U.S. Cl. ........................................ 29/464; 211/204

(58) Field of Classification Search .................. 29/464, 29/466; 403/400; 269/43; 211/70, 204
See application file for complete search history.

(56) References Cited

U.S. PATENT DOCUMENTS 4,074,897 A 2/1978 Behn
6,347,904 B1 2/2002 Knighton
2003/0015486 A1* 1/2003 Chen .......................... 211/70

* cited by examiner

*Primary Examiner*—John C Hong
(74) *Attorney, Agent, or Firm*—Alvin S. Blum

(57) ABSTRACT

An apparatus and method for lifting a plurality of reinforcing bars (rebars) all at one time, and holding them in vertical position while they are connected one at a time to the upper ends of steel elements such as bolts or reinforcing bars protruding from concrete. The apparatus has an elongate lower element with a row of blind holes or recesses in its upper end to receive the lower ends of the bars. An elongate upper element has a row of through holes in registry with the blind holes. The two elements are held apart by cables. A cover on the side of the upper element opens so that the sides of the through holes are exposed so that the bars can be loaded on the sides of the through holes and into the blind holes. The cover is then closed and the apparatus lifted by a crane from the upper element to a position close to the steel elements. Each bar is then lifted from the blind hole, while sliding in the through hole. It is then connected to a steel element. The upper element is then lifted off the bars when all the bars have been connected.

12 Claims, 5 Drawing Sheets

REINFORCING BAR LIFTER AND METHOD OF REINFORCING

BACKGROUND OF THE INVENTION

This invention relates to apparatus and methods for lifting materials with a crane, and more particularly to a lifting apparatus that and positions a plurality of reinforcing bars into a vertical position ready for connecting into a reinforcing assembly for incorporation into a reinforced concrete structure.

In the production of reinforced concrete structures, vertical steel reinforcing bars (rebars) must be precisely positioned and connected to lower steel elements before the pouring forms enclose them. As an example, thirty feet long #11 rebars weight about 160 pounds each. To lift each one separately and hold it vertically while it is being connected to a lower steel element is very difficult and labor intensive. Connection to a lower steel element is generally by a threaded coupling, but may include swaging or welding, for example. A single structure may include hundreds or thousands of such rebars.

SUMMARY OF THE INVENTION

It is accordingly an object of the invention to reduce the labor intensity of the positioning and connecting of vertical rebars. It is another object of the invention to enhance the safety of this operation. It is yet another object of the invention to enhance the speed of this operation. The lifting apparatus of the invention includes a lower element with a row of blind holes, each hole dimensioned to easily receive a lower end of a rebar. An upper element has a correspondingly located row of through holes dimensioned to freely pass the rebars there through. A lifting cable connects each end of the lower element to each end of the upper element. Lifting means on the upper element connect to a crane.

To load the apparatus, it is laid on a flat surface with the upper element spaced apart from the lower element. The upper element has a hinged cover that is opened. When the cover is opened, each of the through holes is open laterally. Each rebar is laid horizontally with the lower end of each rebar inserted into a blind hole in the lower element and an upper portion of the rebar laid into a corresponding open hole in the upper element. After all the rebars are loaded, the cover of the upper element is securely closed. Then the upper element is connected to a crane and the apparatus is lifted and positioned close to the final location where the rebars will be installed. The weight of each bar causes its lower end in its blind hole to rest securely on the bottom panel below all the blind holes. Then each rebar is lifted separately the few inches from its hole in the lower element. The lifted rebar sides up in the through hole in the upper element while being held vertical. The upper element holds the mid portion of the rebars while each connection is made. When all of the bars are connected, the crane can then lift the apparatus up until the upper element is above the tops of the bars. The process is then repeated with a new load of rebars.

These and other objects, features, and advantages of the invention will become more apparent when the detailed description is studied in conjunction with the drawings, in which like elements are designated by life reference characters in the various drawing figures.

DETAILED DESCRIPTION OF PREFERRED EMBODIMENTS

Figure 1:
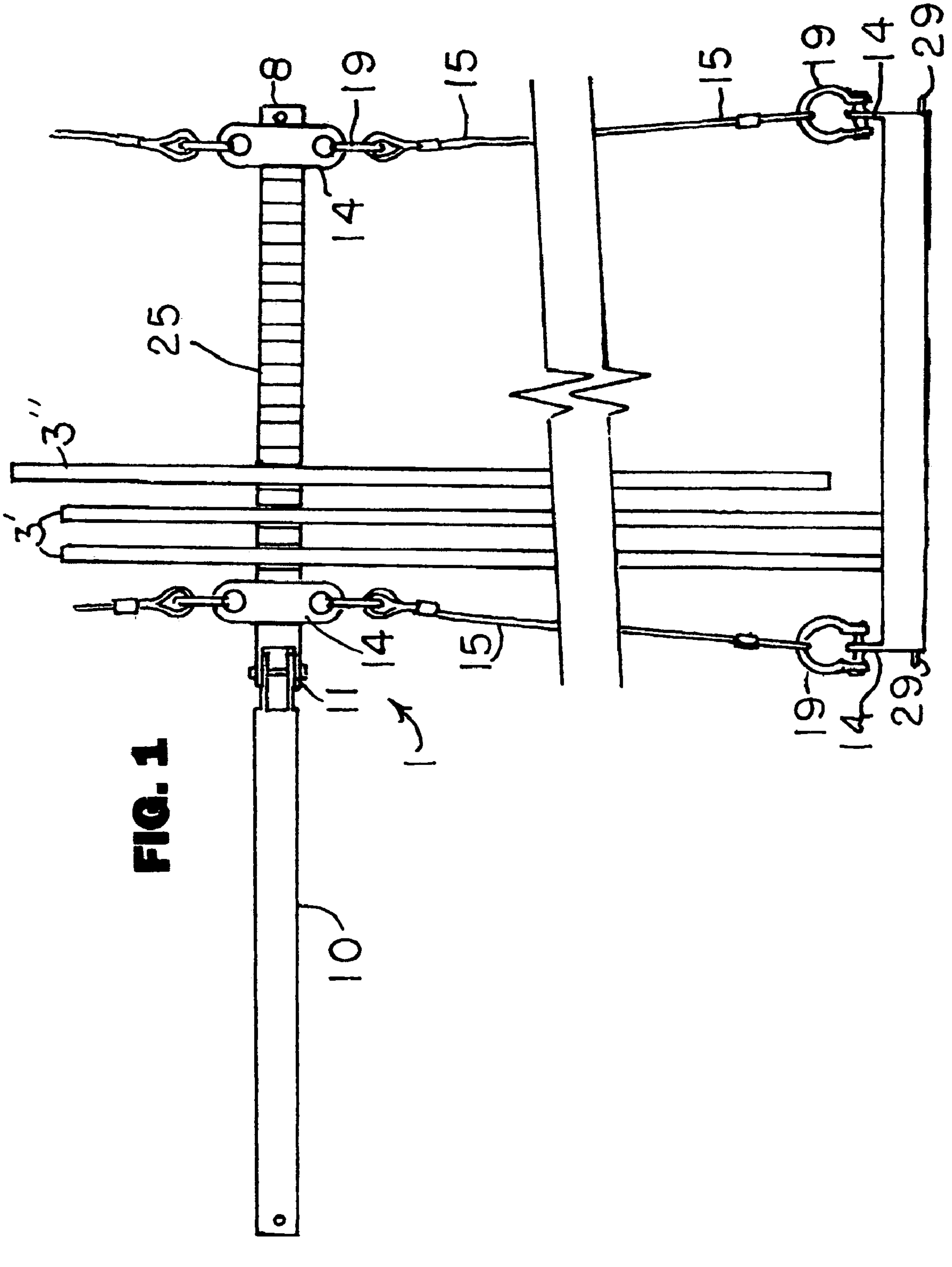
FIG. 1 is a plan view of the lifter on its side on a flat surface being loaded with rebars.
Figure 2:
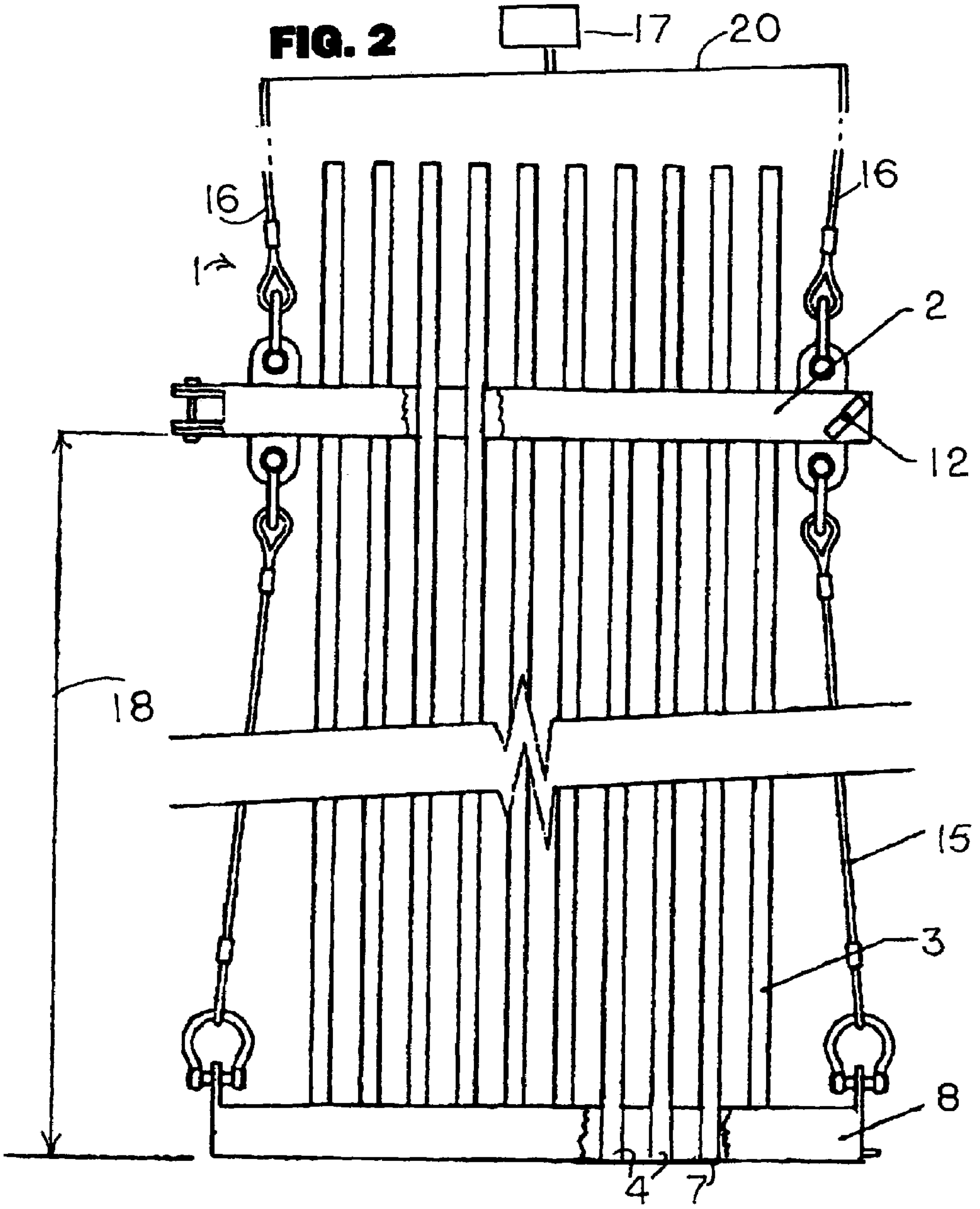
FIG. 2 is a front elevation view of the loaded lifter, with portions broken away, hanging from a crane.

Referring now to the drawing FIGS. 1-7, the lifter apparatus 1 of the invention includes an elongate lower element 2 and an elongate upper element 8 spaced apart from each other by a distance 18. With 30 feet long #11 rebars, the distance 18 is selected at 16 feet. Shackles 19 join cables 15 to connectors 14 at the ends of elements 2 and 8 to maintain the distance 18 when the apparatus is lifted by crane 17. Lift connections 16 connected to the ends of upper element 2 can be removably connected to the cable assembly 20 of the crane 17. This enables one lifter to be in the process of being loaded with bars 3 as shown in FIG. 1 while another lifter already loaded is lifted by the crane as in FIG. 2, and then swung into position as in FIG. 3, where the bars 3 are being connected to lower steel members 21 whose major length is already embedded in concrete 22.

The elongate lower element 2 has an upper member 5 provided with a row of apertures 6 dimensioned to freely pass the rebar to be lifted. A lower member is imperforate so that a bar passing through an aperture in the top member 5 will be stopped and supported by the bottom member engaging the lower end 4 of the bar. The apertures 6 may be referred to as blind holes, since they do not go all the way through the element 2 they may also be termed recesses. The recesses are long enough to prevent the bars from inadvertently lifting out of the recesses and falling. A connector 14 at each end of element 2 is constructed to receive a shackle 19 for lifting. Thus all of the weight of the bars is applied to bottom member 7 during lifting.

The elongate upper element 8 has a row of through holes 9 that pass through the top and bottom of the element. They are dimensioned so that the rebars pass freely through the holes 9. element 8 is formed of two parts, a base 25 and a cover attached to the base by hinge 11 at one end, and a threaded locking bolt 12 at the other end. As best seen in the bar loading process of FIG. 1, the cover 10 is laid open so that bars 3 may be laid onto the holes 9 that have the sides exposed, and then slid into the blind holes in lower element 2. As shown, bar 3" has been laid on the exposed hole, but not yet slid into element 2. The two bars 3' have already been slid into element 2. When all of the bars have been loaded, the cover is closed, and locked with bolt 12. A connector 14 at each end of element 8 is constructed to receive a shackle 19 for connecting cables to lower element 2 and also for connecting to the crane cables. An attachment 29 at each end of the element 2 is provided for attaching guide lines for guiding the suspended apparatus.

Figure 3:
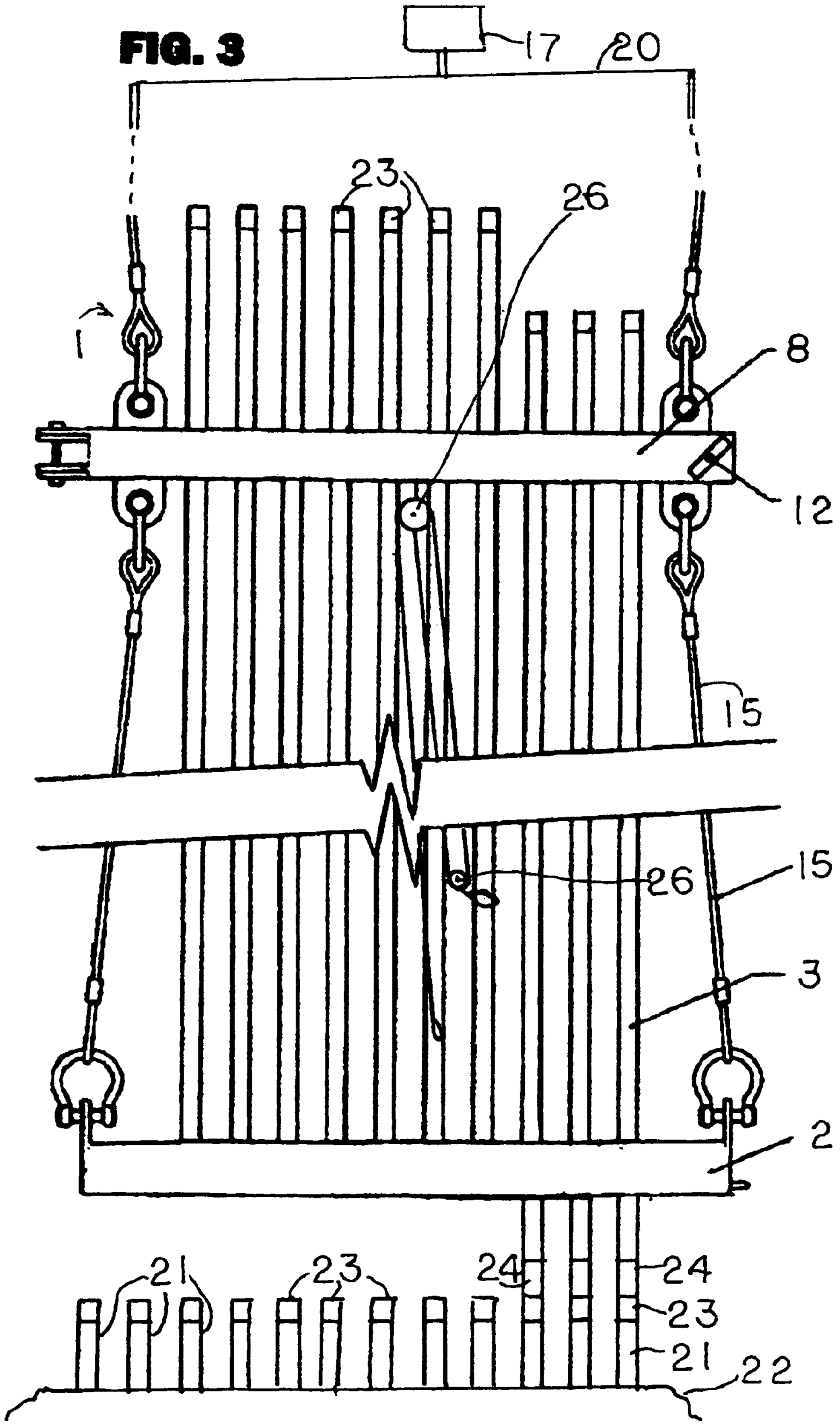
FIG. 3 is a front elevation view of the lifter in operating position while connecting rebars.
Figure 4:
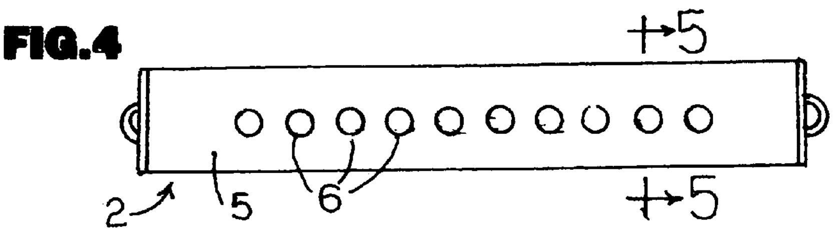
FIG. 4 is a top view of the lower element.
Figure 5:
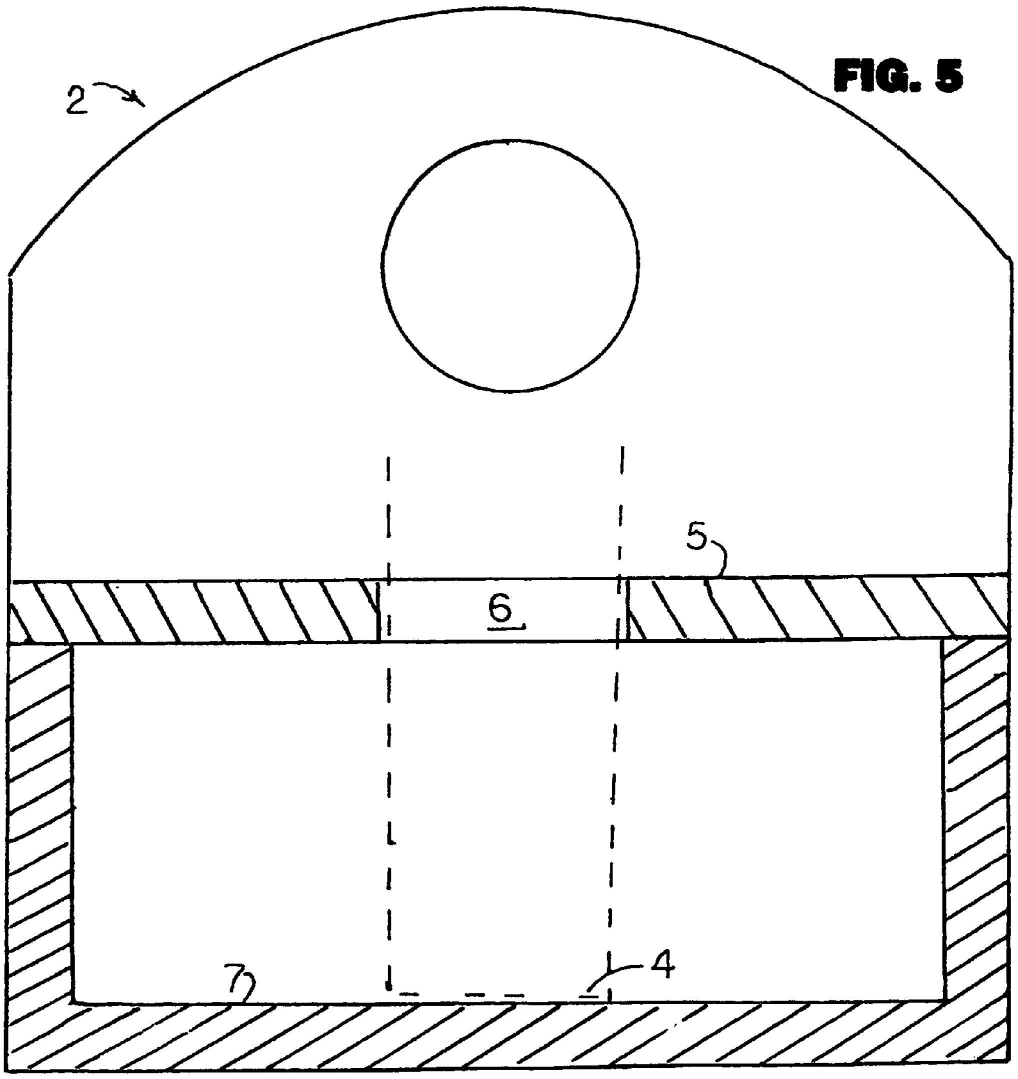
FIG. 5 is a sectional view through line 5-5 of FIG. 4.
Figure 6:
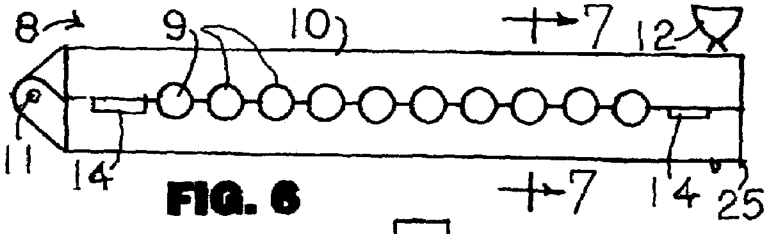
FIG. 6 is a top view of the upper element.
Figure 7:
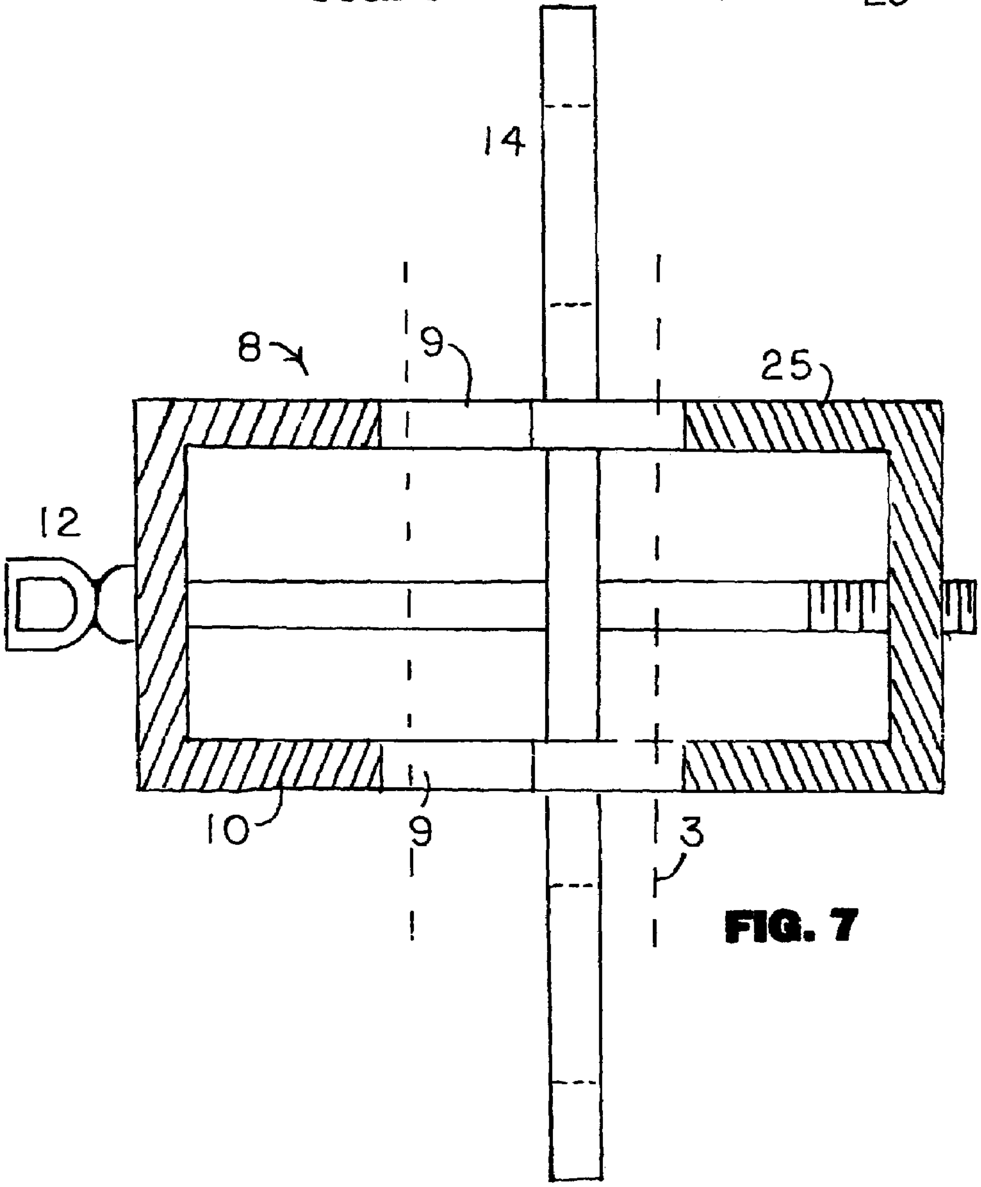
FIG. 7 is a sectional view through line 7-7 of FIG. 6.

As best seen in FIG. 3, the loaded apparatus is hung at the operating position over the lower steel members 21 that may be, for example, bolts or reinforcing bars. Each bar 3 is lifted out of its recess in lower element 2. It remains slidingly supported by the upper element 8. It is then lowered onto the lower steel element 21, as the first three bars have already been connected. Male threaded couplings 24 at the lower end of the bars are screwed into female threaded couplings 23 at the top of the members 21. Other joining methods and connecting members may be employed as desired. As shown in FIG. 3, a pulley assembly 26 may be connected to a bar engaging device to assist in lifting the heavier bars. When all of the bars have been connected, the two elements are lifted up until all of the bars are free of the upper element 8. The lifter 1 may be the lowered to be refilled, as in FIG. 1.

While we have shown and described the preferred embodiments of our invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. Apparatus for lifting and holding a plurality of reinforcing bars in vertical position while fastening each bar in turn to a lower steel member, the apparatus comprising:

a) an elongate lower element having an upper member provided with a straight row of apertures there through, each aperture dimensioned to freely pass a lower end of a reinforcing bar there through, and a lower member providing an obstruction to passage of the reinforcing bar, the lower element having first and second end connectors;

b) an elongate upper element provided with a straight row of through holes in registry with the apertures in the lower element, the holes dimensioned for free passage of the bars, the upper element provided with a cover, the cover, when opened exposing the sides of the through holes so that bars may be passed into the holes from the side of the upper element, the upper element having first and second end connectors;

c) the first connectors of the upper and lower elements constructed for joining the two elements together at a distance at one end and the second connectors constructed for joining the two elements together at the same distance at the other end of the elongate elements; and d) connecting means on the upper element for lifting the joined together upper and lower elements along with a plurality of reinforcing bars held in vertical position for fastening to lower steel members.

2. The apparatus according to claim 1 in which the cover is hinged at one end.

3. The apparatus according to claim 2 further comprising a pulley assembly connected to the upper element for assisting in the lifting of the individual reinforcing bars.

4. The apparatus according to claim 2 further comprising an attachment at each end of the lower element for attaching guide lines for maneuvering the apparatus.

5. The apparatus according to claim 1 further comprising a pulley assembly connected to the upper element for assisting in the lifting of the individual reinforcing bars.

6. The apparatus according to claim 5 further comprising an attachment at each end of the lower element for attaching guide lines for maneuvering the apparatus.

7. The apparatus according to claim 1 further comprising an attachment at each end of the lower element for attaching guide lines for maneuvering the apparatus.

8. Apparatus for lifting and holding a plurality of reinforcing bars in vertical position while fastening each bar in turn to a lower steel member, the apparatus comprising:

a) an elongate lower element having an upper member provided with a row of apertures there through, each aperture dimensioned to freely pass a lower end of a reinforcing bar there through, and a lower member providing an obstruction to passage of the reinforcing bar;

b) an elongate upper element provided with a row of through holes in registry with the apertures in the lower element, the holes dimensioned for free passage of the bars, the upper element provided with a hinged cover, the cover, when opened exposing the sides of all of the through holes so that bars may be passed into the holes from the side of the upper element, and, when closed, holding the bars slidingly within the holes;

c) a connector at each of the two ends of the upper element and at each of the two ends of the lower element for joining the two ends of the upper element to the two ends of the lower element together at a distance by removable cables; and d) connecting means on the upper element for lifting the joined together upper and lower elements along with a plurality of reinforcing bars held in vertical position for fastening to lower steel members.

9. The apparatus according to claim 8 further comprising a pulley assembly connected to the upper element for assisting in the lifting of the individual reinforcing bars.

10. The apparatus according to claim 9 further comprising an attachment at each end of the lower element for attaching guide lines for maneuvering the apparatus.

11. The apparatus according to claim 8 further comprising an attachment at each end of the lower element for attaching guide lines for maneuvering the apparatus.

12. A method of connecting a plurality of vertical reinforcing bars to lower steel members comprising the steps of:

a) providing an elongate lower element with a row of blind holes dimensioned to freely receive a lower and of a reinforcing bar while preventing its passage below the lower element;

b) providing an elongate upper element with a row of through holes dimensioned for free passage of the reinforcing bars there through, the holes being in registry with the blind holes, the upper element having a cover, the cover, when opened exposing the sides of the through holes so that the bars may be passed into the through holes from the side of the element;

c) connecting each end of the lower element to each end of the upper element to join the elements together at a distance;

d) laying the upper element with the cover open and the spaced apart lower element on a flat support surface;

e) loading a lower end of each bar into a blind hole in the lower element while resting an intermediate portion of the bar in a corresponding through hole in the upper element until all of the bars have been loaded;

f) closing the cover;

g) lifting the upper element, which in turn lifts the bars and the lower element;

h) positioning the lifted bars adjacent to the lower steel members;

i) lifting each bar in turn out of its blind hole and fastening it to a lower steel member; and j) lifting the elements above the bars after all the bars have been connected.

* * * * *